(12) United States Patent
Volk

(10) Patent No.: US 12,741,826 B2
(45) Date of Patent: Sep. 22, 2026

(54) TRANSPORT SYSTEM AND METHOD FOR OPERATING A TRANSPORT SYSTEM

(71) Applicant: Schneider Electric Industries SAS, Rueil-Malmaison (FR)

(72) Inventor: Reiner Volk, Helmstadt (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 164 days.

(21) Appl. No.: 18/582,789

(22) Filed: Feb. 21, 2024

(65) Prior Publication Data

US 2024/0359926 A1 Oct. 31, 2024

(30) Foreign Application Priority Data

Feb. 23, 2023 (EP) .................................... 23305241

(51) Int. Cl.
*B65G 47/90* (2006.01)

(52) U.S. Cl.
CPC .................................... *B65G 47/90* (2013.01)

(58) Field of Classification Search
CPC ...................................................... B65G 47/90
See application file for complete search history.

(56) References Cited

U.S. PATENT DOCUMENTS 5,641,053 A * 6/1997 Nannini ............... B65G 47/843 198/471.1
5,871,079 A * 2/1999 Nannini ............... B65G 47/088 198/377.04

(Continued)

FOREIGN PATENT DOCUMENTS

DE 102015104023 A1 9/2016
EP 3028965 A1 6/2016

OTHER PUBLICATIONS

Extended European Search Report dated Aug. 8, 2023 for corresponding European Patent Application No. 23305241.4-1017, 9 pages.

(Continued)

*Primary Examiner* — Saul Rodriguez
*Assistant Examiner* — Brendan P Tighe
(74) *Attorney, Agent, or Firm* — Wolf, Greenfield & Sacks, P.C.

(57) ABSTRACT

A transport system, in particular a multi-carrier system, comprises a plurality of linear motors that are arranged in a row and that define a first path and a second path that differs at least partly from the first path; at least one transport unit that has a transport element, which can be moved by the linear motors in a direction of movement along the first path, and a pick-up element for picking up a transport item to be transported, which pick-up element is configured to be moved along with the transport element in the direction of movement and to be moved relative to the transport element in order to set a distance between the transport element and the pick-up element in a transverse direction that extends transversely to the direction of movement; and a distance unit for setting the distance in the transverse direction between the transport element and the pick-up element during the movement of the transport element so that the pick-up element is moved along and/or in accordance with the second path.

19 Claims, 3 Drawing Sheets

(56) References Cited

U.S. PATENT DOCUMENTS

Figure 1:
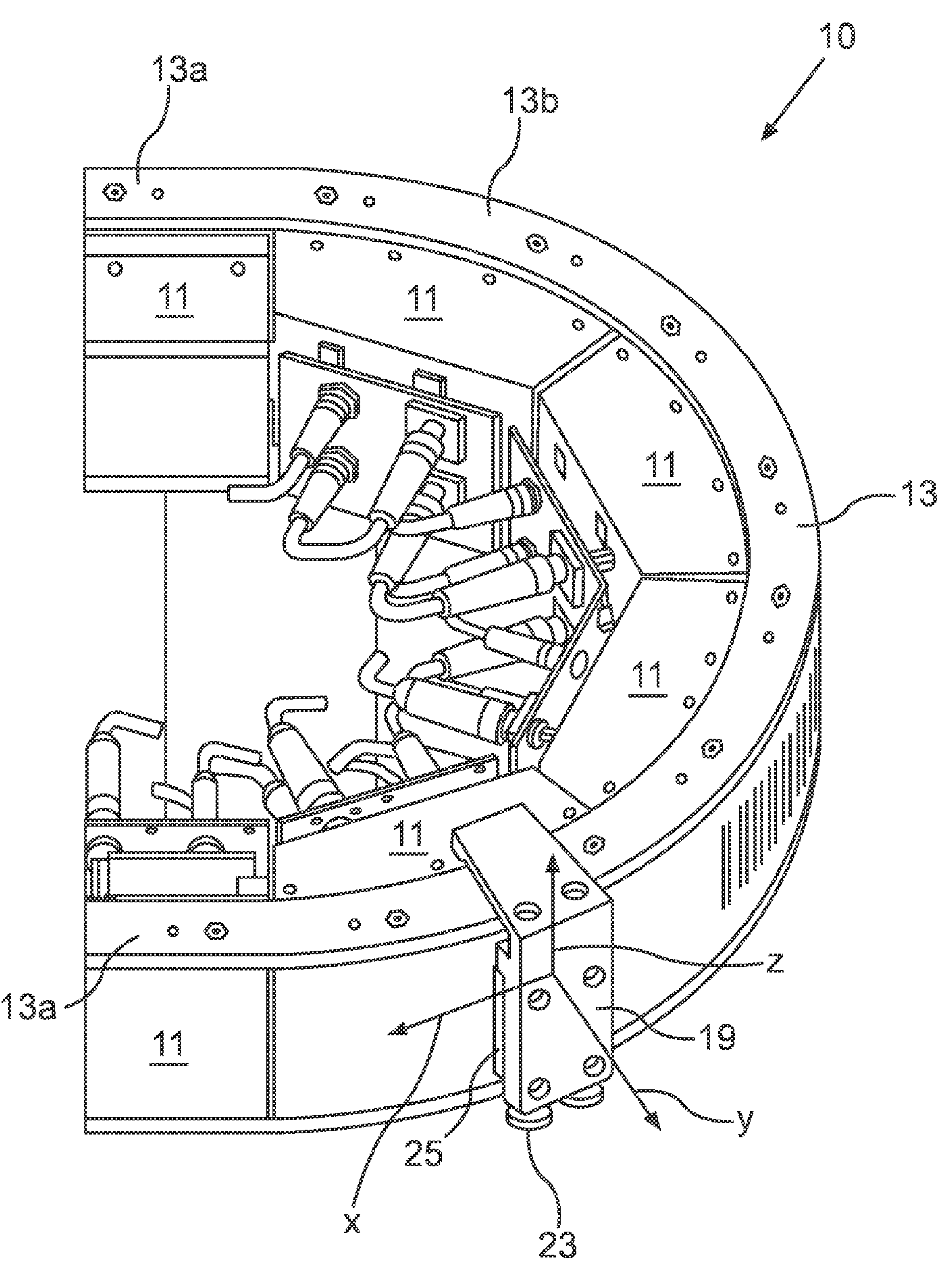

| | | | | |
|---|---|---|---|---|
| 6,922,606 | B1 * | 7/2005 | Yutkowitz | G05B 19/4103 318/560 |
| 10,273,094 | B2 | 4/2019 | Wernersbach et al. | |
| 12,515,893 | B2 * | 1/2026 | Dekocker | B65G 47/68 |
| 2014/0331888 | A1 * | 11/2014 | Wernersbach | B60L 13/006 104/282 |
| 2015/0008768 | A1 * | 1/2015 | Achterberg | B65G 54/02 310/12.11 |
| 2015/0048693 | A1 * | 2/2015 | Prussmeier | H02K 11/33 310/12.09 |
| 2015/0349618 | A1 * | 12/2015 | Kleinikkink | H02K 15/026 310/12.26 |
| 2016/0152414 | A1 | 6/2016 | Aumann et al. | |
| 2017/0050332 | A1 | 2/2017 | Bauer et al. | |
| 2018/0086564 | A1 * | 3/2018 | Clössner | B65G 17/34 |
| 2020/0079596 | A1 * | 3/2020 | Frank | B65G 54/02 |
| 2021/0101761 | A1 | 4/2021 | Tordini et al. | |

OTHER PUBLICATIONS

Examination Report dated Jul. 9, 2024 for corresponding European Patent Application No. 23305241.4, 4 pages.

* cited by examiner 17
21
19
31
25
31
23
27
29a
29b
29
y 15
15b
13
11
13b
11
11
11
29b
23
29
21
29a
19
y
21
29a
19
23
29b
13a
15a

TRANSPORT SYSTEM AND METHOD FOR OPERATING A TRANSPORT SYSTEM

CROSS-REFERENCE TO RELATED APPLICATIONS

This application claims priority to and the benefit under 35 U.S.C. § 119 of European Patent Office (EPO) Application No. 23305241.4, filed on Feb. 23, 2023.

The invention relates to a transport system, in particular a multi-carrier system, and to a method for operating such a transport system.

Such transport systems have a plurality of linear motors, also designated as segments, that are arranged in a row and that define a path for moving transport units or transport elements along the path. The paths are usually made up of straight sections and curved sections that can also be designated as curve sections. When the transport units are moved along the path, they experience a sudden change in the centrifugal acceleration at the curve transition from a straight section to a curve section, or vice versa. At the curve transition, this means a large jerk that acts on the respective transport unit and that corresponds to the time derivative of the acceleration. This jerk can result in transport items that are transported by the transport unit being lost or damaged.

To avoid this, it is desired to reduce the jerk. To reduce the jerk, it is known, for instance, to arrange additional transition segments between the straight segments and the curve segments, said transition segments redesigning the path course and in particular the curve transition such that the jerk is reduced. Furthermore, it is known to reduce the speed of the transport units shortly before the curve transition. These solutions are therefore costly, affect the path course or have a negative impact on the performance of the transport system by slowing down the transport units.

It is an object of the present invention to propose a transport system and a method for operating such a transport system, in which the jerk can be reduced with a reduced effort and an improved performance of the transport system.

This object is satisfied by the subject of the independent claims. Advantageous embodiments are the subject of the dependent claims and result from the description and the drawings.

The transport system according to the invention is in particular a multi-carrier system and comprises a plurality of linear motors that are arranged in a row and that define a first path and a second path that differs at least partly from the first path; and at least one transport unit. The transport unit has a transport element, which can be moved by the linear motors in a direction of movement along the first path, and a pick-up element for picking up a transport item to be transported. The pick-up element is configured to be moved along with the transport element in the direction of movement and to be moved relative to the transport element in order to set a distance between the transport element and the pick-up element in a transverse direction that extends transversely to the direction of movement. Furthermore, the transport system comprises a distance unit for setting the distance in the transverse direction between the transport element and the pick-up element during the movement of the transport element so that the pick-up element is moved along and/or in accordance with the second path.

That the first path and the second path differ at least partly, not only means that they are physically two different paths, but also that they are at least partly different in terms of their course, i.e. at least partly have a different course. In other words, the first path and the second path are not congruent, at least not over their entire course, if they were to be superimposed, for example.

The direction of movement and the transverse direction in particular refer to a co-moving coordinate system of the transport element. The transverse direction here refers to a direction transverse, i.e. orthogonal, to the direction of movement. The transverse direction can in particular be the direction in which the centrifugal force acts. The direction of movement can also be designated as the x direction and the transverse direction can also be designated as the y direction. A third z direction in the co-moving coordinate system extends orthogonally to the x direction and the y direction. The z direction can in particular correspond to the vertical direction when the transport element moves horizontally.

That the pick-up element is configured to be moved relative to the transport element in the transverse direction, means that the movement of the pick-up element relative to the transport element has at least one movement component in the transverse direction. It is not necessary for the movement to take place precisely and exclusively in the transverse direction.

Since the distance in the transverse direction between the transport element and the pick-up element can be set during the movement of the transport element along the first path, the distance in the transverse direction between the pick-up element and the first path is consequently also variable. Due to the distance unit, it is possible to set the distance so that the pick-up element, at which the transport item is arranged, follows the second path while it is moved along with the transport element driven along the first path.

This makes it possible, for example, to design the second path in a jerk-optimized manner, in particular at the transitions between curve sections and straight sections, so that the jerk acting on the pick-up element at these curve transitions is significantly reduced. The temporal rate of change or the time derivative of the acceleration is designated as "jerk" in this respect. This prevents transport items from being lost or damaged. At the same time, for instance, a redesign of the first path or a reduction in the speed of the transport units before curve transitions can be omitted so that the solution according to the invention involves comparatively little effort and also does not have a negative effect on the performance of the transport system.

Each linear motor can in particular have six outer surfaces, namely an upper side, a lower side, an outer side, an inner side, and two side surfaces. In this respect, the side surfaces of adjacent linear motors are spaced apart from one another by a small expansion gap of approximately 0.1 mm to 0.2 mm or directly contact one another. The guide track for the transport elements can be formed at the outer side. The inner side is arranged in the region of an inner space of the transport system.

The transport system or the multi-carrier system can be peripherally formed so that the linear motors form a self-contained path along which the transport unit or the transport units can theoretically be endlessly moved in the same direction. However, it is also possible for the linear motors to form open paths with a starting point and an end point.

The transport elements are in particular magnetically driven. For this purpose, the transport elements have one or more permanent magnets that are acted on by a driving force by means of a changing and/or wandering magnetic field generated by the linear motors. The drive force leads to a movement of the transport elements in the direction of movement along the first path. The transport elements can in particular be moved independently and separately from one another. By means of the pick-up elements, transport items, such as workpieces or products, can be transported with the respective transport unit.

The transport element can also be designated as a carrier, a mover, or a runner; the linear motor, on the other hand, can also be designated as a stator.

The first path preferably has straight path sections and curved path sections. The second path at least has curved path sections, but can also have straight path sections. The curved path sections can also be called curve sections. The first path is always designed as continuous to effect the movement of the transport elements. The second path can generally likewise be designed as continuous; however, it is also conceivable that the second path may be interrupted multiple times. For example, it is conceivable that the second path is only present at the sections at which the pick-up element is to implement a movement that deviates from the first path. This can in particular be the case at curves and/or curve transitions.

Straight path sections of the first path can extend in parallel with straight path sections of the second path. This has the effect that the distance between the transport element and the pick-up element is not changed in the transverse direction as long as the transport unit is moved along the straight sections. The straight path sections can in particular be arranged vertically and/or horizontally offset from one other.

The second path preferably has at least one curve section that follows a clothoid. A clothoid is a curve shape in which the curvature at any point of the curve is proportional to the length of its arc up to the point. Its curvature thus increases linearly. This results in a gradual increase in the centrifugal acceleration instead of a sudden increase. The jerk at the curve transition is thereby significantly reduced.

In general, the second path can have at least one curve section that directly follows a straight path that has a smaller curvature than the first path (for example, in the plan view of the transport system) so that the jerk that is caused by the second path is smaller than a jerk that would be caused by the first path (and the greater curvature).

In an advantageous embodiment, the first path and the second path are offset from one another. The paths can in particular be arranged vertically offset, i.e. arranged vertically above or below one another. The two paths can thereby be arranged at the linear motors without crossing one another and such that the transport unit can be moved along the paths.

The pick-up element can be movably supported at the transport element transversely to the direction of movement, in particular by means of a plain bearing. It is thereby ensured that the pick-up element is indeed moved along with the transport element in the direction of movement, but is movable or displaceable relative to the transport element in the transverse direction. Frictional forces in the transverse direction can be largely eliminated by the execution by means of a plain bearing.

According to one embodiment, the distance unit has a spacer that has a first contact section and a second contact section. The spacer can be a plunger, for example. To set the distance, the first contact section is fastened to the pick-up element and the second contact section contacts the second path, in particular a cam disk of the second path. The spacer is configured as a rigid element so that a constant distance is always maintained between the pick-up element and the second path while the pick-up element is moved along with the transport element. Since the second contact section contacts the second path, it runs along it. This causes the pick-up element to follow the second path.

The pick-up element can be preloaded in the direction of the second path, in particular by means of a spring, so that the spacer always remains in contact with the second path. Alternatively, the second contact section can be immovably guided or guided in a compulsory manner at the second path in the transverse direction. This means that the second contact section is movably guided along the direction of extent of the second path, but is immovable relative to the second path in the transverse direction. For example, the second contact section can engage into a groove running along the second path. It is likewise ensured that the distance between the pick-up element and the second path is always kept constant.

A further possible embodiment provides that the distance unit has a motor that is configured to set the distance in the transverse direction between the transport element and the pick-up element in accordance with the position of the transport element along the first path. The motor can in particular be controlled such that it sets the distance synchronously with the position of the transport element along the first path.

The pick-up element can be preloaded in the direction of the second path, in particular by means of a spring. In this case, the deflection of the pick-up element in the transverse direction can take place due to the centrifugal force that acts against the preload force. There is then no need for a cam disk on the second path.

The invention furthermore relates to a method for operating the previously described transport system. The method has the following steps:

- controlling the linear motors to move the transport element in the direction of movement along the first path;
- setting the distance in the transverse direction between the transport element and the pick-up element during the movement of the transport element by means of the distance unit so that the pick-up element is moved along and/or in accordance with the second path.

In all other respects, the statements made about the method according to the invention apply accordingly to the transport system according to the invention. It is understood that all the features and embodiments mentioned herein can be combined with one another, unless explicitly stated otherwise.

Figures 2, 3:
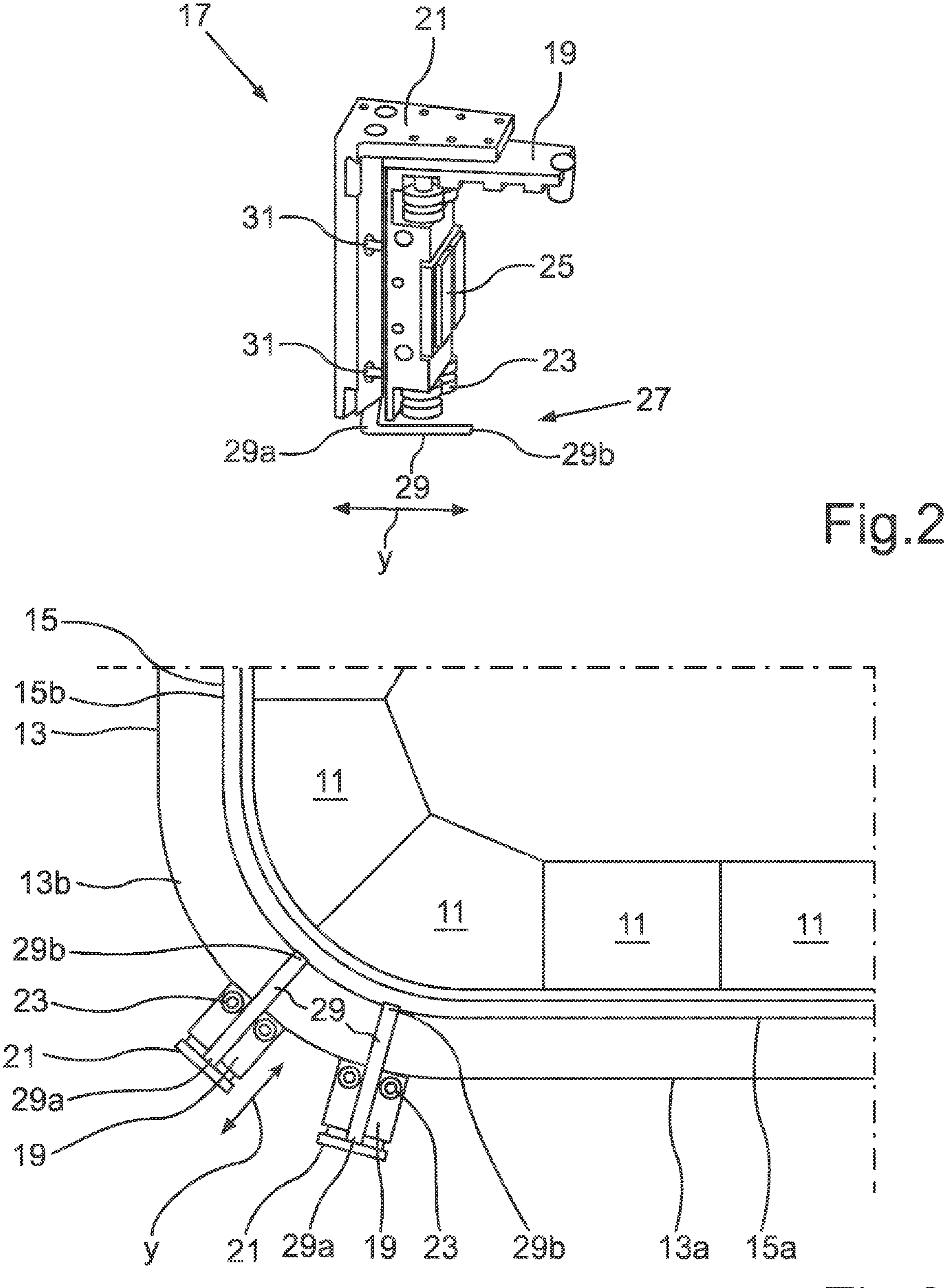
Figure 4:
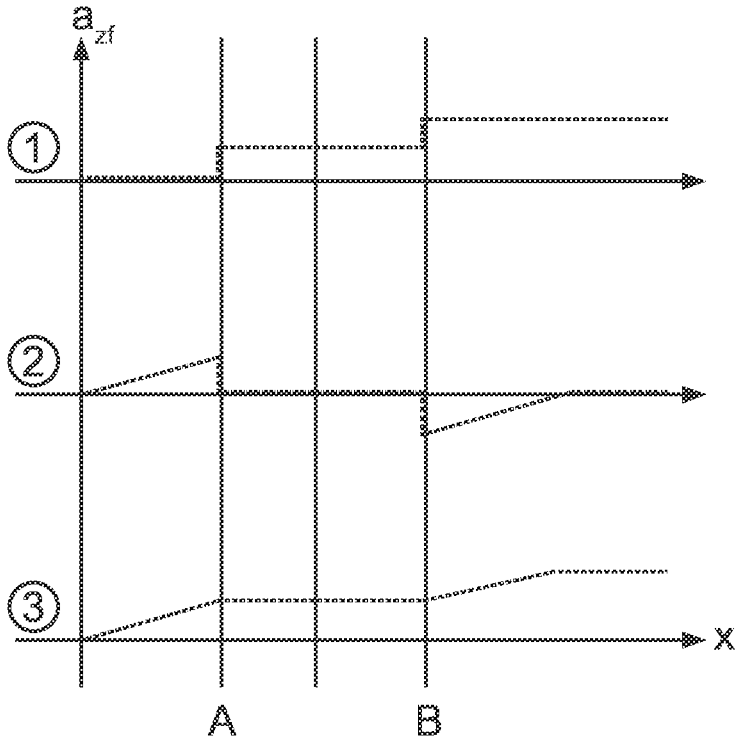
Figure 5:
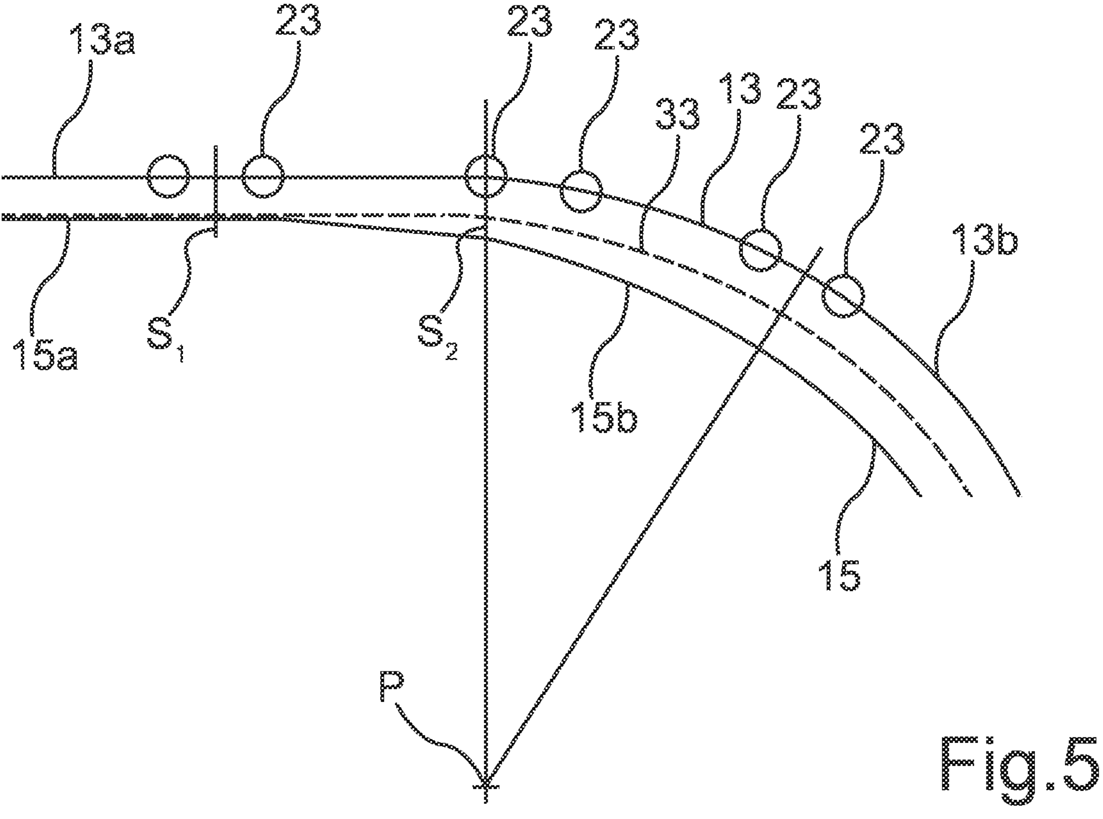

The invention will be described schematically and by way of example with reference to the drawings. It is shown therein:

FIG. 1 a perspective view of a transport system configured as a multi-carrier system in accordance with an embodiment;

FIG. 2 a perspective view of a transport unit;

FIG. 3 a schematic view of a transport system configured as a multi-carrier system from below in accordance with an embodiment;

FIG. 4 a representation of the centrifugal acceleration acting on the transport element and on the pick-up element when driving through a bend; and FIG. 5 a representation of a curve transition of the first path and the second path in accordance with an embodiment in which the curve section of the second path follows a clothoid.

FIG. 1 schematically shows a part of a transport system 10 configured as a multi-carrier system. The transport system 10 has a plurality of linear motors 11 that are arranged in a row and that define a first path 13. Furthermore, FIG. 1 shows that the first path 13 has straight path sections **13*a* and a curved path section 13*b* that can also be designated as a curve section 13***b*. The linear motors 11 furthermore define a second path 15 that is at least partly different from the first path 13, but is not visible in FIG. 1. This will be explained in more detail below.

In FIG. 1, a transport element 19 is further shown that can be moved by the linear motors 11 in a direction of movement x along the first path 13. Together with a pick-up element 21, which was omitted in FIG. 1, the transport element 19 forms a transport unit 17 shown in FIG. 2 that is described in more detail below. To be able to be driven magnetically, the transport element 19 has permanent magnets 25 that are acted on by a drive force by means of a changing and/or wandering magnetic field generated by the linear motors 11. The drive force leads to a movement of the transport elements 19 in the direction of movement x along the first path 13. Rollers 23 provided at the transport element 19 in this respect roll along the first path 13, in particular along a rail of the first path 13. The transport elements 19 can in particular be moved independently and separately from one another.

As already mentioned, FIG. 2 shows an embodiment of a transport unit 17 comprising a transport element 19 and a pick-up element 21. The pick-up element 21 can pick up transport items to be transported, not shown in FIG. 2, such as workpieces or products. The pick-up element 21 is furthermore attached to the transport element 19 such that it is indeed moved along with the transport element 19 during a movement thereof in the direction of movement x, but is movable relative to the transport element 19 in a transverse direction y. In the present embodiment, this movability is ensured by plain bearings 31. The transverse direction y extends transversely, i.e. orthogonally, to the direction of movement and corresponds to the direction of action of the centrifugal acceleration in the present embodiment.

FIG. 2 furthermore shows a distance unit 27 that has a rigid spacer 29 in this embodiment. The spacer 29 is configured as a plunger and has a first contact section 29*a* fastened to the pick-up element 21 and a second contact section 29*b*.

FIG. 3 shows a view of a transport system 10 from below, in which the first path 13 described above can be seen. The rollers 23 of the transport element 19 roll along the first path. A second path 15 is furthermore shown that is defined by a cam disk located vertically below the first path 13. Like the first path 13, the second path 15 has straight path sections 15*a* and curved path sections or curve sections 15*b*. However, it is also conceivable that the second path 15 has gaps and is in particular only present at those sections at which it is desired that the pick-up element 21 follows a path guidance deviating from the first path 13. This can in particular be the case in curve sections or in the region of curve transitions.

As FIG. 3 shows, the second contact section 29*b* of the spacer 29 contacts the second path 15 and scans it. The spacer 29 thus ensures that a certain distance is maintained in the transverse direction y between the second path 15 and the pick-up element 21, while the pick-up element 21 is moved along with the transport element 19 in the direction of movement x. At the same time, the pick-up element 21 is preloaded in the direction of the second path 15 by means of a spring, not shown, so that the second contact section 29*b* does not lose contact with the second path 15. Alternatively, it would also be conceivable that the second contact section 29*b* is immovably guided at the second path 15 in the transverse direction y, for example, by engaging into a groove which extends along the second path 15 and through which said second contact section 29*b* is guided in a compulsory manner in the transverse direction y.

Thus, the distance in the transverse direction y between the transport element 19 and the pick-up element 21 is set by means of the distance unit 27 so that the transport element 19 follows the course of the first path 13 and the pick-up element 21 is moved along with it, but follows the course of the second path 15.

Other implementations of the distance unit 27 than the one shown here are generally also conceivable. The distance unit 27 can, for instance, have a motor configured to set the distance in the transverse direction y between the transport element 19 and the pick-up element 21 synchronously with the position of the transport element 19 along the first path 13. The pick-up element 21 can furthermore be preloaded in the direction of the second path 15 and deflected in the transverse direction y against the preload force due to the centrifugal force.

FIG. 5 shows, by way of example, the courses of a first path 13 and a second path 15 in the region of a curve section around a curve center P and in the region of a curve transition. In this example, the curved path section 15*b* of the second path 15 follows a clothoid so that the curvature at each point of the curve is proportional to the length of its arc up to this point, i.e. increases linearly. A virtual comparison path 33 is also shown with a dashed line. The virtual comparison path 33 corresponds to the second path 15 if it did not follow a clothoid, but were continued in accordance with the first path 13.

As the comparison of the second path 15 and the virtual comparison path 33 shows, the curved path section 15*b* of the second path 15 begins earlier than the curvature of the virtual comparison path 33, namely at the path point $S_1$. A further path point $S_2$ corresponds to the point at which the curvature of the virtual comparison path 33 would begin. The curvature of the curved path section 15*b* thereby gradually increases, which has the result that the increase in the centrifugal acceleration acting on the pick-up element 21 can be extended to a larger path section of the path 15 and leads to a reduced jerk.

This is also clearly shown in FIG. 4. The courses shown therein show the increase in the centrifugal acceleration $a_{zf}$ over the position along the path in the direction of movement x.

Line (1) describes the course of the centrifugal acceleration $a_{zf}$ for the transport element 19. Position A corresponds to a position at which a first of two rollers 23 of the transport element 19 reaches a curved path section 13*b* of a first path 13. At this position, the centrifugal acceleration $a_{zf}$ increases abruptly, which corresponds to an infinitely large jerk (time derivative of the centrifugal acceleration $a_{zf}$). At a second position B, the second roller 23 of the transport element 19 reaches the curved path section 13*b*. In this position, the transport element 19 experiences a second sudden increase in the centrifugal acceleration $a_{zf}$.

Line (2) corresponds to the additional acceleration acting on the pick-up element 21 and the transport item. Since the curvature of the clothoid begins earlier, the centrifugal acceleration increases even before reaching the position A. However, due to the gradual increase in the curvature, the centrifugal acceleration increases linearly instead of abruptly. Between the positions A and B, the additional acceleration is equal to zero since the pick-up element 21 continues to move further towards the circle center at a constant speed. The centrifugal acceleration acting on the pick-up element 21 and the transport item is approximately constant in this region, where one roller 23 is located in the straight path section 13*a* and the other roller 23 is located in the curved path section 13*b*. After the second roller 23 of the transport element 19 has reached the curved path section 13*b* at the position B, the transport element 19 already follows a stronger curvature than the pick-up element 21 that follows the second path 15 so that a negative additional acceleration of the pick-up element 21 results. It increases linearly due to the continuing gradually increasing curvature of the clothoid.

Line (3) corresponds to the sum of (1) and (2), i.e. to the acceleration actually acting on the pick-up element 21 and the transport item. It can be seen therein that the pick-up element 21 and the transport item do not experience any sudden increases in the centrifugal acceleration. A significant reduction in the jerk that acts on the pick-up element 21 and the transport item thus results.

REFERENCE NUMERAL LIST

10 transport system
11 linear motor
13 first path
13*a* straight path section
13*b* curved path section
15 second path
15*a* straight path section
15*b* curved path section
17 transport unit
19 transport element
21 pick-up element
23 roller
25 permanent magnet
27 distance unit
29 spacer
29*a* first contact section
29*b* second contact section
31 plain bearing
33 comparison path
P curve center
$S_1$ path point
$S_2$ path point

The invention claimed is:

1. A transport system comprising:

a plurality of linear motors that are arranged in a row and that define a first path, which has straight path sections and curved path sections, and a second path which differs at least partly from the first path and which at least has curved path sections;

at least one transport unit that has a transport element, which can be moved by the linear motors in a direction of movement (x) along the first path, and a pick-up element for picking up a transport item to be transported, which pick-up element is configured to be moved along with the transport element in the direction of movement (x) and to be moved relative to the transport element in order to set a distance between the transport element and the pick-up element in a transverse direction (y) which extends transversely to the direction of movement (x), wherein the direction of movement (x) and the transverse direction (y) refer to a co-moving coordinate system of the transport element, and a centrifugal force which the transport element experiences in the curved path sections acts in the transverse direction (y); and a distance unit for setting the distance in the transverse direction (y) between the transport element and the pick-up element during the movement of the transport element so that the pick-up element is moved along and/or in accordance with the second path.

2. The transport system according to claim 1, wherein the straight path sections of the first path extend in parallel with straight path sections of the second path.

3. The transport system according to claim 1, wherein the second path has at least one curve section which follows a clothoid.

4. The transport system according to claim 1, wherein the first path and the second path are vertically off set from one another.

5. The transport system according to claim 1, wherein the pick-up element is movably supported at the transport element transversely to the direction of movement (x).

6. The transport system according to claim 5, wherein the pick-up element is movably supported at the transport element transversely to the direction of movement (x), by means of a plain bearing.

7. The transport system according to claim 1, wherein the distance unit has a spacer which has a first contact section and a second contact section, with the first contact section fastened to the pick-up element and the second contact section in contact with the second path in order to set the distance.

8. The transport system according to claim 7, wherein the second contact section is immovably guided at the second path in the transverse direction (y).

9. The transport system according to claim 7, wherein the pick-up element is preloaded in the direction of the second path, by means of a spring, or in that the second contact section is immovably guided at the second path in the transverse direction (y).

10. The transport system according to claim 9, wherein the pick-up element is preloaded by means of a spring.

11. The transport system according to claim 1, wherein the distance unit has a motor that is configured to set the distance in the transverse direction (y) between the transport element and the pick-up element in accordance with a position of the transport element along the first path.

12. The transport system according to claim 1, wherein the pick-up element is preloaded in the direction of the second path, by means of a spring.

13. The transport system according to claim 12, wherein the pick-up element is preloaded by means of a spring.

14. The transport system according to claim 1, wherein:

the linear motors are configured to move the transport element in the direction of movement (x) along the first path; and the distance unit is configured to set the distance in the transverse direction (y) between the transport element and the pick-up element during the movement of the transport element by means of the distance unit so that the pick-up element is moved based on the second path.

15. The transport system according to claim 1, wherein the transport system is a multi-carrier system.

16. The transport system according to claim 1, wherein the first path and the second path are vertically offset from one another.

17. A transport system comprising:

a plurality of linear motors that are arranged in a row and that define a first path, which has straight path sections and curved path sections;

a cam disk that defines a second path which differs at least partly from the first path and which at least has curved path sections;

at least one transport unit that has a transport element, the transport element configured to be moved by the linear motors in a direction of movement (x) along the first path, and a pick-up element configured to pick up a transport item to be transported, wherein the pick-up element is configured to be moved along with the transport element in the direction of movement (x) and to be moved relative to the transport element in order to set a distance between the transport element and the pick-up element in a transverse direction (y) which extends transversely to the direction of movement (x), wherein the direction of movement (x) and the transverse direction (y) refer to a co-moving coordinate system of the transport element, and a centrifugal force which the transport element experiences in the curved path sections acts in the transverse direction (y); and a distance unit having a spacer configured to trace the cam disk to set the distance in the transverse direction (y) between the transport element and the pick-up element during the movement of the transport element so that the pick-up element is moved based on the second path.

18. The transport system according to claim 17, wherein the straight path sections of the first path extend in parallel with straight path sections of the second path.

19. The transport system according to claim 17, wherein the second path has at least one curve section which follows a clothoid.

* * * * *